United States Patent Office 3,439,193
Patented Apr. 15, 1969

3,439,193
NUCLEAR REACTOR WITH THERMIONIC CONVERTER ARRAY
Andre Marc Bensussan, Paris, France, assignor to CSF—Compagnie Generale de Telegraphie Sans Fil, Paris, France
Filed Jan. 5, 1965, Ser. No. 423,441
Claims priority, application France, Jan. 7, 1964, 959,521
Int. Cl. H02n *11/00*
U.S. Cl. 310—4      3 Claims

ABSTRACT OF THE DISCLOSURE

A thermionic converter providing a number of hollow anode elements and a number of cathode elements containing nuclear fuel and having electron emissive areas, said anode and cathode elements being arranged in columns and rows in a checkerboard arrangement with the columns being surrounded by dielectric material, all the elements in every row being electrically connected in series.

---

The present invention relates to the utilization of the nuclear energy of atomic reactors, and more particularly to the direct conversion of this energy into electricity by means of thermionic converters.

A converter installation, mounted on the inside of an atomic reactor, has already been described in the literature (see in particular the works edited by "Academic Press," New York and London: "Space Power Systems," 1961, pp.389–398, and "Advances in Electronics and Electron Physics," 1962, vol. 17, pp. 196–197).

The converters of this installation are thermionic diodes of the type with "cesium vapor." The electrodes of the diodes are constituted by coaxial cylinders. The interior cylinders form the "emitters" (positive electrodes or cathodes), and the external cylinders form the "collectors" (negative electrodes or anodes). The nuclear fuel rods (fissile material) of the atomic reactor are placed on the inside of the cathode cylinders which receive directly the heat produced in the rods by the nuclear reactions. In this manner the cathodes are maintained at a sufficiently elevated temperature (of the order of 2,000° K.) in order that an electron emission takes place from the cathodes toward the anodes, maintained by a cooling system with a much lower temperature (of the order of 1,000° K.). The diodes, connected in series, are aligned along a common axis and placed on the inside of a cylindrical jacket, made of an electric insulating material, which is a good heat conductor. The cooling of the anodes is realized by the circulation of an alloy (NaK) in the molten state about the insulating jacket which is in contact with the anodes.

This prior art arrangement presents a certain number of inconveniences:

the elements, enclosed in an insulating jacket, are inaccessible from the outside of this jacket;
the evacuation of the gaseous products of the nuclear reactions is difficult, if not practically impossible;
the anodes are not in direct contact with the coolant;
precautions must be taken to avoid that the cesium vapor, furnished by a common reservoir to an assembly of diodes in series, forms a single plasma within the entire assembly;
the calculation of the neutronic operation of the reactor is very difficult;
in order to assure the divergence of the reactor, it may prove necessary to provide supplementary fuel rods not utilizable for the production of electricity, etc.

The present invention has as its object a new assembly of thermionic diodes with nuclear heating. freed of the aforementioned inconveniences.

According to the present invention, an assembly of thermionic diodes comprising each an emissive cathode, heated directly or indirectly by the nuclear energy of a fissile material, and an anode facing the cathode, is characterized in that it comprises:

$n$ hollow blocks of anode material (hereinafter referred to as A blocks), open at both extremities thereof, and $n$ cathode blocks (referred to hereinafter as C blocks), containing the said fissile material either surrounded or not surrounded by a sheath, the entirety of the blocks being disposed in columns and rows, the A blocks alternating with the C blocks both in the columns and in the rows, each pair of alternate A and C blocks of a column having faces adjacent a predetermined interval in such a manner as to constitute the interelectrode space of a thermionic diode whereas in each row the A and C blocks are connected in series.

According to a preferred embodiment of the present invention, an electric insulation of refractory material, good heat conductor and possibly serving as moderator for the atomic reactor, for example, the glucina, is disposed about columns of anode and cathode blocks.

Accordingly, it is an object of the present invention to provide a thermionic converter for the direct conversion of heat into electrical energy in atomic reactors which obviates by simple means the aforementioned shortcomings and drawbacks encountered with the prior art constructions.

Another object of the present invention resides in the provision of a direct thermionic energy converter for use in atomic reactors which is simple in construction yet permits accessibility to the elements from the outside thereof.

A further object of the present invention resides in the provision of a direct thermionic energy converter for nuclear reactors which enables a more intense and efficient cooling of some of the electrode elements thereof.

Still another object of the present invention resides in the provision of a direct thermionic energy converter for nuclear reactors which not only permits readily the evacuation of the gaseous products of the nuclear reactions but also entails the advantages of other reactors as regards ease of control thereof.

These and other objects, features, and advantages of the present invention will become more obvious from the following description when taken in connection with the accompanying drawing which shows for purposes of illustration only, several embodiments in accordance with the present invention, and wherein:

FIGURE 1 is a cross-sectional view through a direct thermionic energy converter in accordance with the present invention, along line I—I of FIGURE 2, FIGURE 2 is a cross-sectional view of the direct thermionic energy converter of FIGURE 1, taken along line II—II of FIGURE 1, FIGURE 3 is a perspective view, partially in cross-section, of the direct thermionic energy converter of FIGURES 1 and 2, FIGURE 4 is an equivalent electrical schematic diagram of the thermionic energy converter of FIGURES 1 to 3, FIGURES 5, 6, and 7, are partial cross-sectional views, similar to FIGURE 1, of three modified embodiments of direct thermionic energy converters in accordance with the present invention, and FIGURE 8 is a cross-sectional view, similar to FIGURE 1, through a direct thermionic energy converter in accordance with the present invention provided with a direct heating system.

In the various figures, the same elements are designated by identical reference numerals.

FIGURES 1 and 2 represent an assembly of thermionic converters with nuclear heating, whereby FIGURE 1 is a cross section taken along I—I of FIGURE 2 and FIGURE 2 a cross section taken along II—II of FIGURE 1.

The converters are diodes formed by C and A blocks disposed in a checkerboard manner, that is in vertical columns and horizontal rows in which the blocks of the two types alternately succeed one another both in the same columns and in the rows. The C blocks constitute the cathodes or emitters and the A blocks the anodes or collectors, the materials being suitably chosen (for example, copper for the collectors, and tantalum, molybdenum, or thoriated tungsten for the emitters).

In each vertical column the blocks are separated by very slight intervals 1 which form the interelectrode spaces of the diodes. Thus, in the example of FIGURE 1, each column, counting five blocks, forms four interelectrode spaces and comprises consequently four diodes.

Each block, disposed between two other blocks of the same column, constitutes by its two horizontal faces the anodes or cathodes of two diodes, connected in opposition.

On the other hand, the A blocks of the columns 1, 2, and 3 are electrically connected to the C blocks adjacent the following columns by way of conductors 2. Similar conductors 2 are connected to the C blocks of the first column and to the A blocks of the last or fourth column.

The connection thus realized is represented by the electric diagram of FIGURE 4. The chains PQ and TU comprise each four diodes in series. Between the points R and S, one has two chains in series, connected in parallel. By connecting together the points P, R, T, on the one hand, and the points Q, S, U, on the other, one obtains an assembly of four series chains, connected in parallel. One may thus regulate, at will, the voltage and the output to be obtained by choosing the number of diodes in each chain or horizontal row and the number of chains to be connected in parallel.

The C and A blocks are hollow and open at the two extremities thereof. On the inside of the C blocks are disposed nuclear fuel cores 3 (fissile material, for example, uranium carbide UC), the length of the cores being greater than that of the C blocks which surround the same. The hollow spaces of the A blocks are utilizable for the passage of a coolant liquid.

Walls 4 of a refractory material, which is an electrical insulation and good heat conductor such as glucina, is provided about the assembly and between the columns of the blocks, which may serve at the same time as moderator for the atomic reactor, formed by the cores 3.

The connecting conductors 2 between elements of neighboring columns traverse the insulating partition walls 4. On the other hand, for sake of convenience of the connection, all of the blocks are provided with small support plates 5 which are embedded in the insulating walls 4 without being in contact with each other. These support plates 5 may, of course, be suppressed if one obtains another manner of supporting the blocks.

The operation of the atomic reactor being assured by an adequate dimensioning of the cores 3 and of the absorbing walls 4, the emitters C, heated directly by the heat produced in the cores 3 by the nuclear reactions, find themselves carried at a high temperature (of the order of 2,000° K.). The diodes then produce an output, an electron emission taking place from the emitters toward the collectors. The latter are maintained at a temperature of the order of 1,000° K. by a circulation of refrigerating fluid on the inside of the A blocks. This fluid may be constituted advantageously by a molten metal or alloy, for example, NaK.

The electric current, produced in the diodes, may be utilized in external loads, and the heat due to the nuclear reactions of the reactor is thus converted directly into electrical energy.

The thermionic diodes may be of a vacuum type or filled with gas (for example, cesium vapor), the latter being generally preferred in practice, for they permit to utilize more important interelectrode spaces than the vacuum-type diodes. In case of utilization of cesium vapor diodes, the described installation comprises reservoirs (not illustrated in the drawings) which supply this gas to the interelectrode spaces of the diodes in a conventional manner.

FIGURE 3 represents a perspective view cut open and corresponding to FIGURES 1 and 2.

In the FIGURES 1, 2, and 3, the C and A blocks have straight sections in the form of rectangles but one may also adapt other forms of straight cross sections. Thus, FIGURE 5 represents a cross-section through a modified embodiment of the present invention in which the C blocks are hollow cylinders, receiving cylindrical nuclear fuel cores 3, and the hollow A blocks have two faces coaxial with the cathode cylinders facing the same.

The present invention is susceptible of numerous modifications as known to a person skilled in the art of which the following represent only a few and are indicated only for illustrative purposes.

Figure 1:
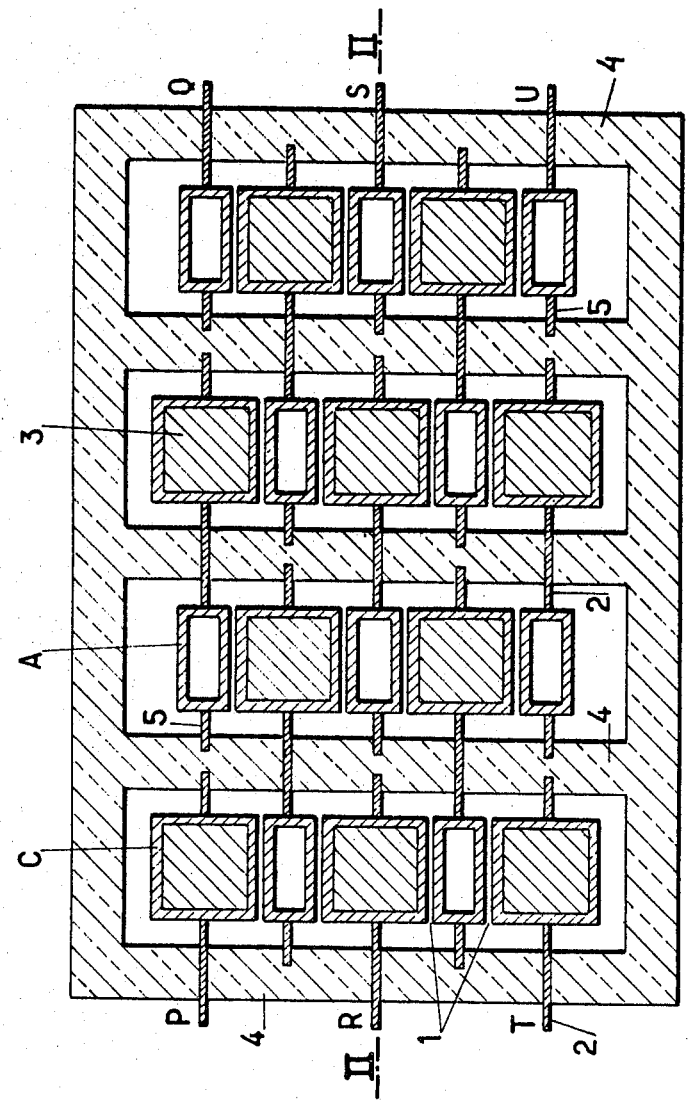
Figure 2:
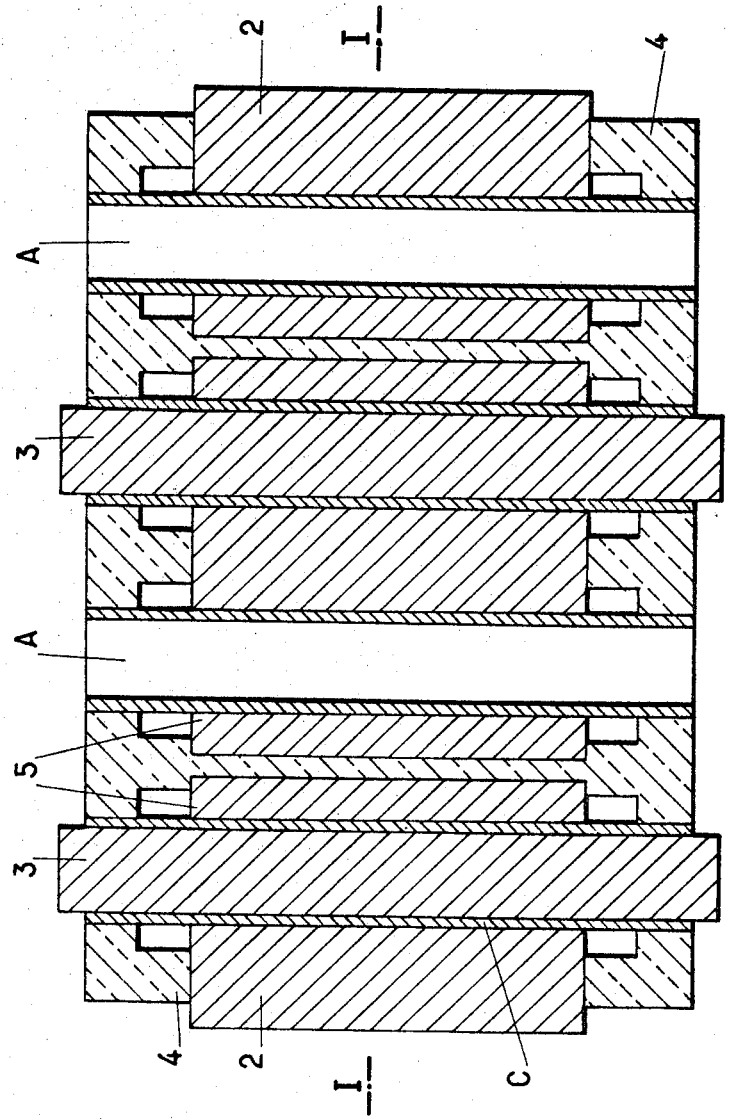
Figure 3:
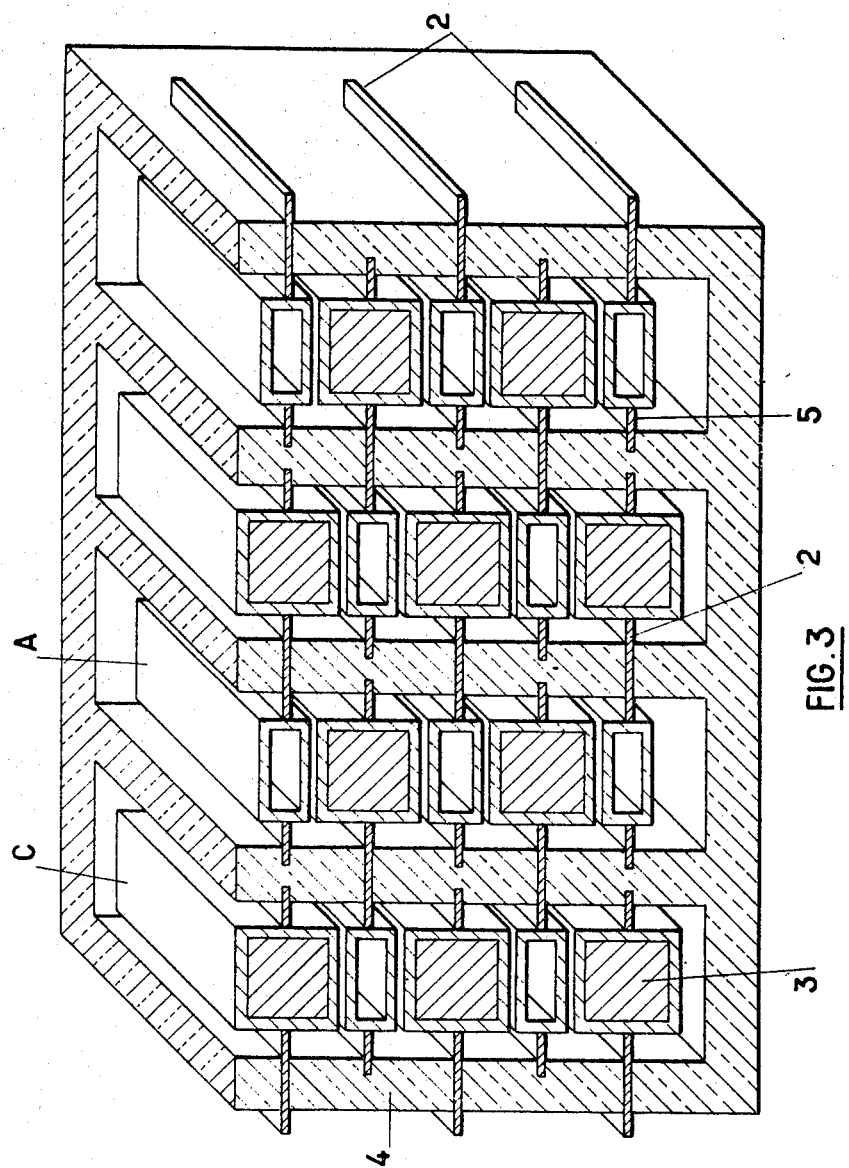
Figure 4:
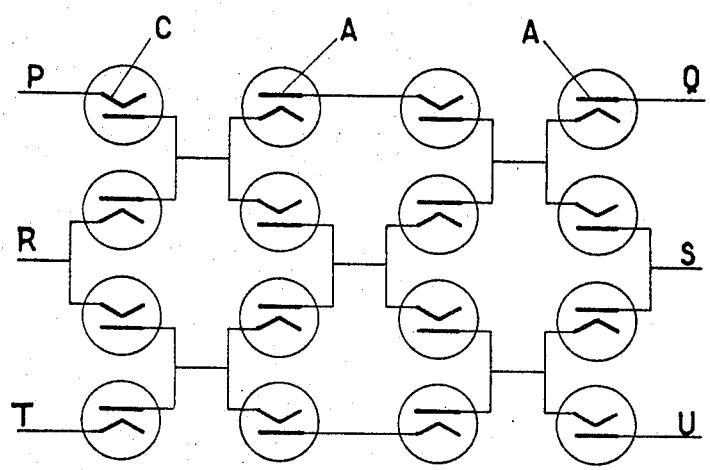
Figure 5:
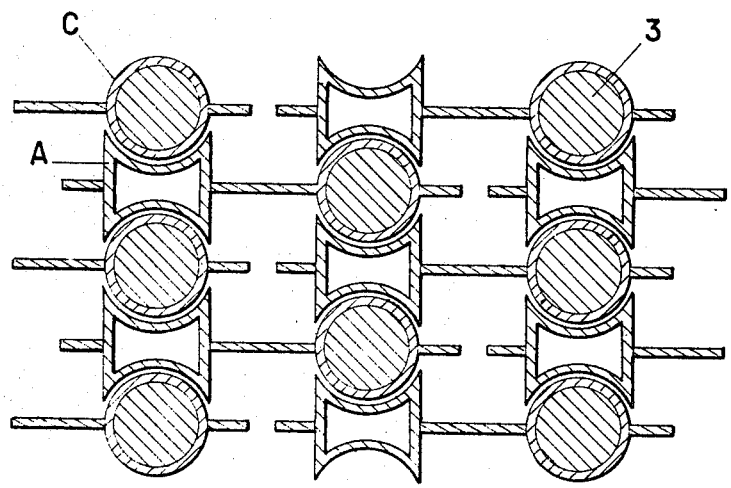
Figure 6:
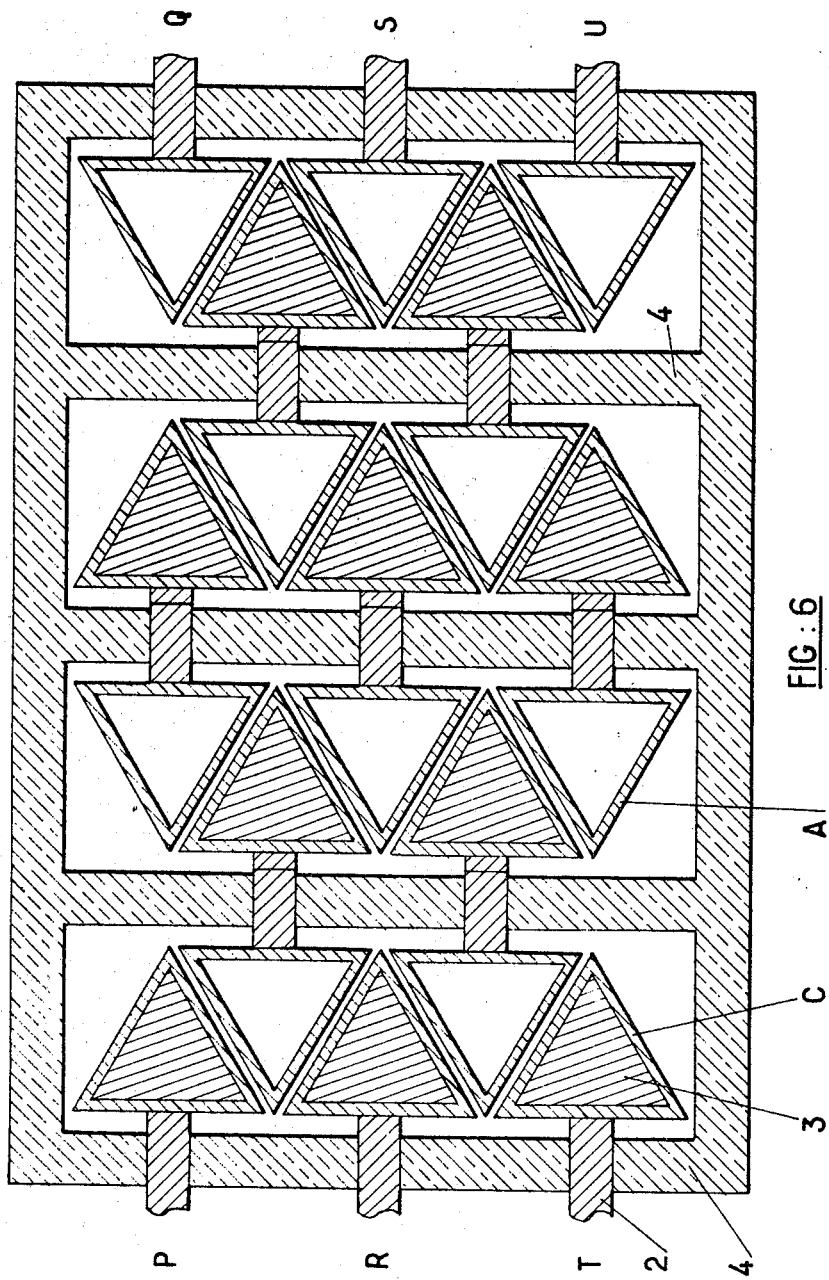
FIGURE 6 shows a modified embodiment in which the cathode and anode blocks have a triangular shape.
Figure 7:
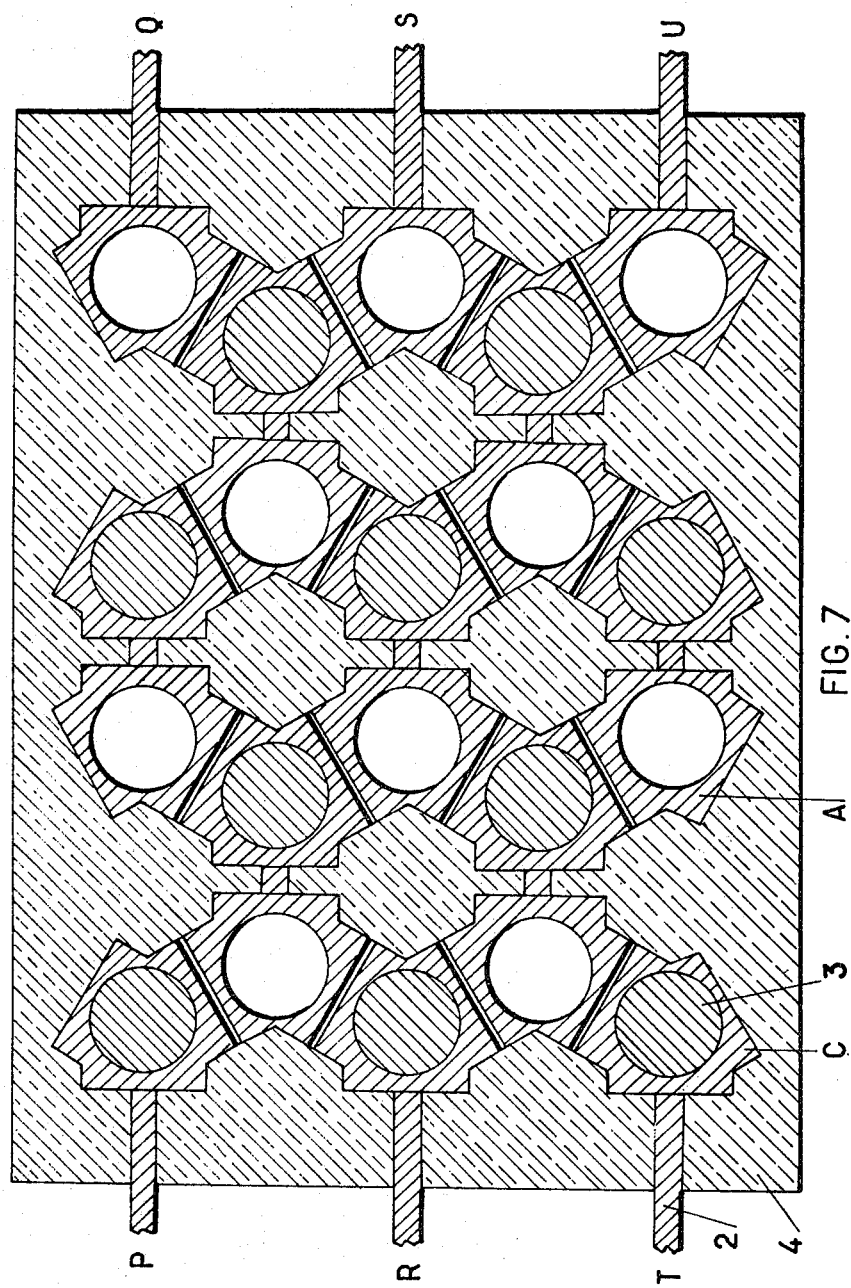
FIGURE 7 represents a connection in which the interior channels of circular cross-section are provided in A and C blocks.
Figure 8:
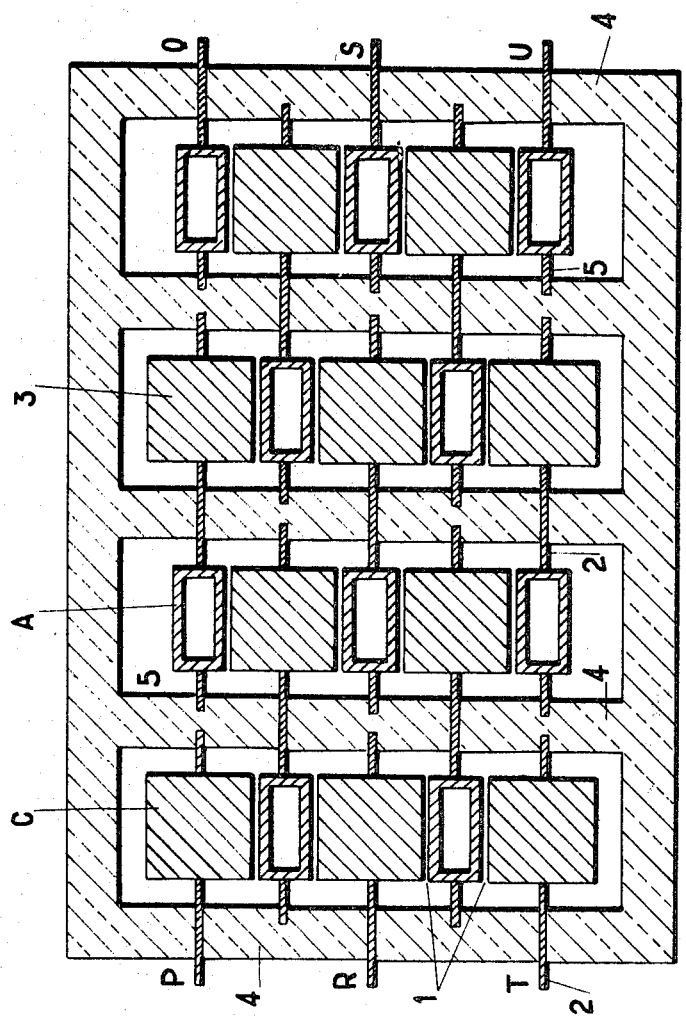

The diodes represented in FIGURES 1, 2, 3, 5, 6, and 7 are of the indirect heated type, since the emissive cathodes constitute therein sheaths or covers surrounding the nuclear fuel cores. However, one may also suppress the sheaths or covers and utilize the fissile cores directly as emissive cathodes. One then obtains the connection and assembly with direct heating illustrated in FIGURE 8.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. For use in a nuclear reactor, a thermionic converter for directly converting nuclear energy into electricity, comprising:

a number of elongated hollow anode elements, open at the two extremities thereof, and an equal number of elongated solid cathode elements containing nuclear fuel and having electron emissive areas on the external surfaces thereof, said anode and cathode elements extending substantially parallel to each other in columns and rows, anode elements alternating with cathode elements both in the columns and in the rows, and adjacent elements in every column being separated by relatively narrow spaces to form effectively thermionic diodes while all the elements of every row are electrically connected in series.

2. For use in a nuclear reactor, a thermionic converter for directly converting nuclear energy into electricity, comprising:

a number of elongated hollow anode elements, open at the two extremities thereof, and an equal number of elongated solid cathode elements containing nuclear fuel and having electron emissive areas on the external surfaces thereof, said anode and cathode elements extending substantially parallel to each other in columns and rows, anode elements alternating with cathode elements both in the columns and in the rows, and adjacent elements in every column being separated by relatively narrow spaces to form effectively thermionic diodes while all the elements of every row are electrically connected in series, the columns of alternate anode and cathode elements being surrounded by walls made of a refractory dielectric material having moderator properties for the nuclear reactor.

3. For use in a nuclear reactor, a thermionic converter for directly converting nuclear energy into electricity, comprising:

a plurality of anode means, and a plurality of cathode means having nuclear fuel and effectively provided with electron emissive areas, said anode and cathode means extending in predetermined relationship to each other in columns and rows with anode and cathode means alternating both in the columns and in the rows, said anode and cathode means being separated by relatively narrow spaces to form effectively thermionic diodes, and means operatively connecting said anode and cathode means in series, and the columns of alternate anode and cathode means being surrounded by walls made of a refractory dielectric material.

References Cited

UNITED STATES PATENTS

| | | |
|---|---|---|
| 2,661,431 | 12/1953 | Linder. |
| 3,093,567 | 6/1963 | Jablonski et al. _____ 310—4 X |
| 3,113,091 | 12/1963 | Rasor et al. _____ 310—4 |
| 3,176,165 | 3/1965 | Lawrence _____ 310—4 |
| 3,211,930 | 10/1965 | Clement et al. _____ 310—4 |

J. D. MILLER, *Primary Examiner.*

D. F. DUGGAN, *Assistant Examiner.*

U.S. Cl. X.R.

176—39